US 8,321,853 B2

(12) United States Patent
Currier et al.

(10) Patent No.: US 8,321,853 B2
(45) Date of Patent: Nov. 27, 2012

(54) TYPE AND PROPERTY DEFINITION SUPPORT FOR SOFTWARE

(75) Inventors: Jeffrey R. Currier, Issaquah, WA (US); Alexander W. DeNeui, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1219 days.

(21) Appl. No.: 11/801,811

(22) Filed: May 11, 2007

(65) Prior Publication Data

US 2008/0282224 A1 Nov. 13, 2008

(51) Int. Cl.
*G06F 9/44* (2006.01)
*G06F 9/445* (2006.01)

(52) U.S. Cl. ........ 717/168; 717/110; 717/113; 717/116; 717/120; 717/169; 717/171; 717/173; 717/174; 717/177; 707/999.1; 707/999.102; 707/999.103; 707/999.104

(58) Field of Classification Search .................. 717/110, 717/113, 116, 120, 168, 169, 171, 173, 174, 717/177; 707/999.1, 999.102, 999.103, 999.104
See application file for complete search history.

(56) References Cited

U.S. PATENT DOCUMENTS

| | | | |
|---|---|---|---|
| 5,819,283 A * | 10/1998 | Turkowski ............................. 1/1 |
| 6,209,040 B1 * | 3/2001 | Acton et al. .................. 719/315 |
| 6,230,159 B1 * | 5/2001 | Golde .................................... 1/1 |
| 6,338,056 B1 | 1/2002 | Dessloch et al. |
| 6,976,029 B2 * | 12/2005 | Venkatesh et al. .................... 1/1 |
| 7,076,784 B1 | 7/2006 | Russell et al. |
| 7,092,933 B1 | 8/2006 | Milby |
| 2004/0002991 A1 * | 1/2004 | Bogdan et al. ................. 707/102 |
| 2005/0021540 A1 * | 1/2005 | McKee et al. .................. 707/100 |
| 2005/0144619 A1 * | 6/2005 | Newman ......................... 717/177 |
| 2005/0177581 A1 * | 8/2005 | Sezgin et al. .................. 707/100 |
| 2005/0177585 A1 * | 8/2005 | Venkatesh et al. ............. 707/100 |
| 2005/0188354 A1 * | 8/2005 | Finocchio ...................... 717/116 |
| 2006/0026178 A1 * | 2/2006 | Wolf et al. ..................... 707/100 |
| 2006/0195467 A1 | 8/2006 | Pearce et al. |
| 2006/0200486 A1 | 9/2006 | Castro et al. |
| 2007/0005734 A1 * | 1/2007 | Abdo ............................. 709/219 |
| 2007/0016647 A1 * | 1/2007 | Gupta et al. ................... 709/206 |
| 2007/0079282 A1 * | 4/2007 | Nachnani et al. ............. 717/106 |
| 2008/0034044 A1 * | 2/2008 | Bhakta et al. ................. 709/206 |

OTHER PUBLICATIONS

Johnson et al, "The User-Defined Product Framework", 1998, http://citeseerx.ist.psu.edu/viewdoc/summary?doi=10.1.1.149.1232, p. 1-16.*
"Working with CLR User-Defined Types", http://msdn2.microsoft.com/en-us/library/ms186366.aspx, 2007.
Johnson, et al., "The User-Defined Product Framework", pp. 1-15, 1998.

* cited by examiner

*Primary Examiner* — Emerson Puente
*Assistant Examiner* — Charles Swift

(57) ABSTRACT

Aspects of the subject matter described herein relate to type and property definition support for software. In aspects, new types can be added to an application model after the software has been created without changing the software. After software is created and embodied in computer code, a new type definition may be received by a user type service. The user type service may then place the new type definition in a data store in which other types native to the software are located. The software may then use the new type definitions and properties associated therewith in queries and in user interfaces provided by the software.

15 Claims, 6 Drawing Sheets

TYPE AND PROPERTY DEFINITION SUPPORT FOR SOFTWARE

BACKGROUND

When designing a software product, software developers typically determine the types of data structures that the software will utilize. These data structures may correspond to screens of user data that may be available in the software product. For example, an e-mail software product may include data structures that correspond to contacts, calendars, tasks, and so forth. The data structures for the contacts may correspond to certain contact information that the software developers have determined are important to have in the product and may not include other information that is determined to not be important.

When the software is shipped, the data types the software can work with may be hard-coded in the software and not changeable. To make the software work with new data types, a new version of the software that is designed to work with the new data types may be released. This provides very little flexibility for companies to change the data types that a software product may utilize.

SUMMARY

Briefly, aspects of the subject matter described herein relate to type and property definition support for software. In aspects, new types can be added to an application model after the software has been created without changing the software. After software is created and embodied in computer code, a new type definition may be received by a user type service. The user type service may then place the new type definition in a data store in which other types native to the software are located. The software may then use the new type definitions and properties associated therewith in queries and in user interfaces provided by the software in conjunction with existing types.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
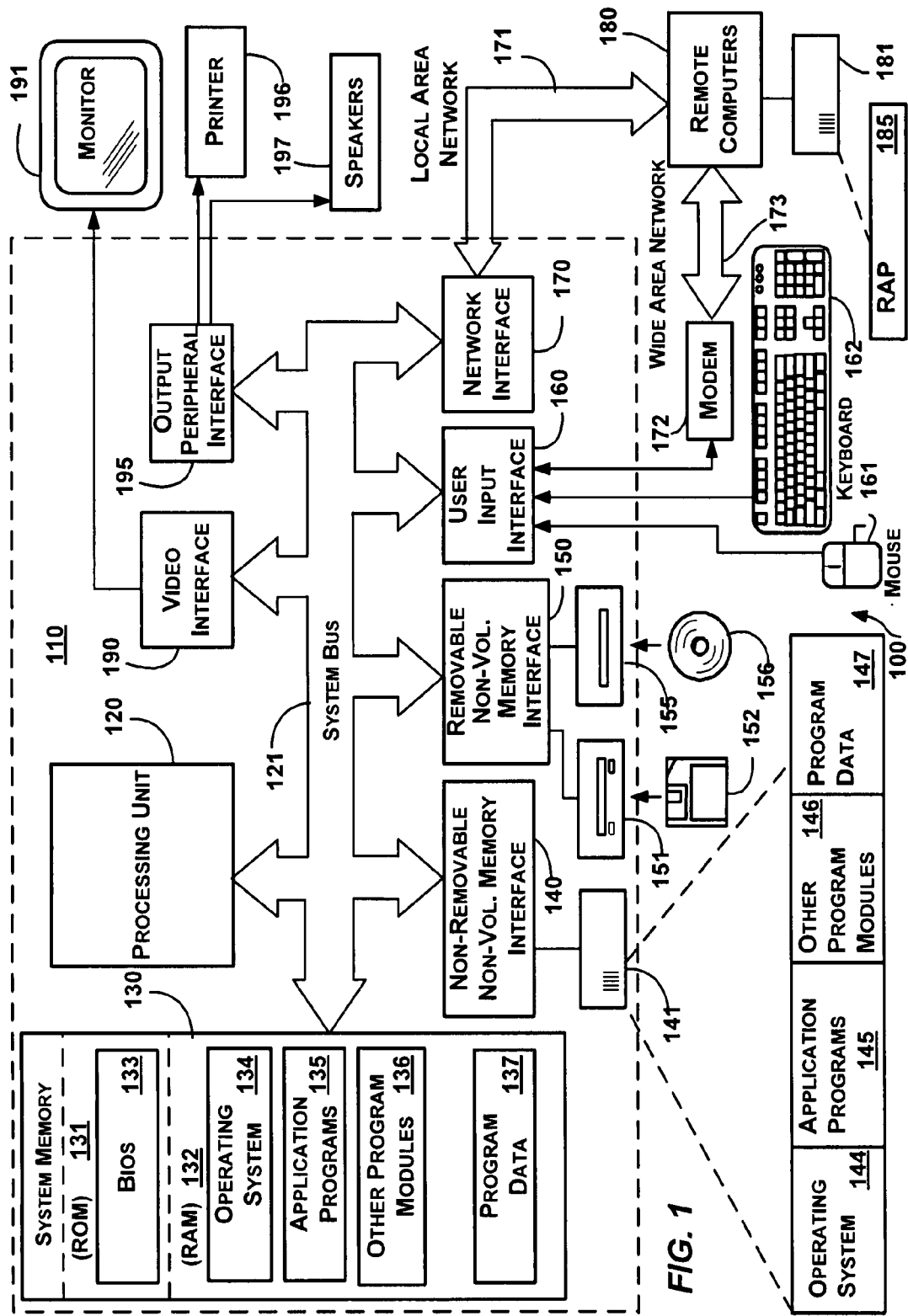
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Supporting New Types and Properties

As mentioned previously, when shipped, most software has a fixed set of data types that the software understands. This may be very limiting to companies, value added resellers, and end users who may wish to add additional types and/or properties to an existing product. Aspects of the subject matter described herein are adapted to address this and other needs.

Figure 2:
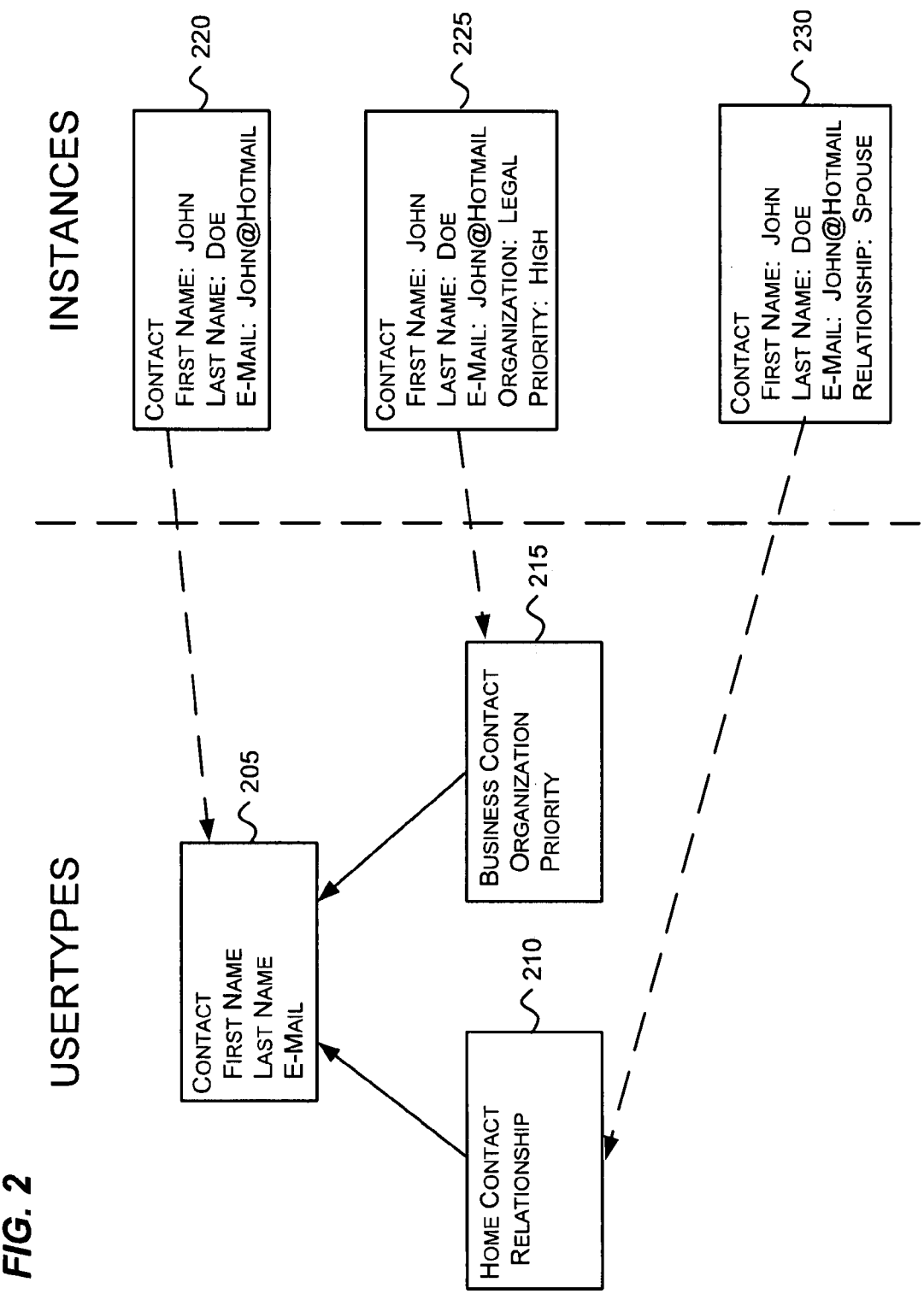
FIG. 2 is a block diagram that generally represents a exemplary type that has been extended in accordance with aspects of the subject matter described herein.

FIG. 2 is a block diagram that generally represents an exemplary type that has been extended in accordance with aspects of the subject matter described herein. A product may ship being able to support a contact type 205. The contact type 205 may describe three properties such as first name, last name, and e-mail address.

After shipping a software product, it may be desired to extend the contact type 205 for information that may be used in a home contact type 210. For example, a user may desire to add a relationship property to the contact type 205 to obtain the home contact type 210.

Similarly, after shipping, a business entity may wish to extend the contact type 205 with properties useful in a business context. For example, the business may desire to add organization and priority properties to the contact type 205 to obtain a business contact type 215.

The instances 220, 225, and 230 are objects that include properties defined by the contact types 205, 210, and 215, respectively. Note that the instances 225 and 230 have additional properties not included in the instance 220.

In extending the contact type 205, a business (or end user) may use its own terms (e.g., names) to describe the new properties. The business may also add additional business logic to, for example, validate or take advantage of the new properties.

In an embodiment, after extending the contact type, the end user or business may have the additional data fields corresponding to the new properties of instances of objects defined by the new types displayed on screens that allow a user to update or modify data in the data fields. Furthermore, the end user or business may create queries that use the new data properties.

A query may be stored in a query object. A query may specify certain criteria that may be used to locate data. For example, a user could create a query to return e-mail messages that have not been read, business e-mail that has been received in the last seven days, and so forth. As another example, a user could create a query that returns photos that have not been viewed that include images of the user's family. It will be readily understood that the examples above are not exhaustive and that many other queries could be created with various criteria without departing from the spirit or scope of aspects of the subject matter described herein.

A query may be expressed in terms of conditions on properties. For example, the priority property of the business contact data structure 215 may be used in a query to find e-mails from business contacts having a high priority in the priority property field.

The new properties that are defined in a new type may be simple or complex. Simple properties may include scalar values such as strings, numbers, dates, and so forth. Complex properties may relate to other data structures and/or may include a combination of simple properties.

For example, a complex property may describe relationship information about two objects. For example, a photo image may be stored in a data store. The photo may have been taken by a person represented by a contact object. Furthermore, the photo may also include people whom are represented by contact objects. A complex property may indicate a relationship between two objects (e.g., a contact and a photo) and may specify information about the relationship (e.g., the person represented by this contact took this photo, or the person represented by this contact is in this photo).

As another example, a complex property may describe relationships between home contacts. For example, the complex property may indicate that a contact is a child, sibling, mother, or father of another contact. With this relationship information, queries such as "who are all the children or siblings of this contact," or "who is the father or mother of this contact" may be satisfied.

Figure 3:
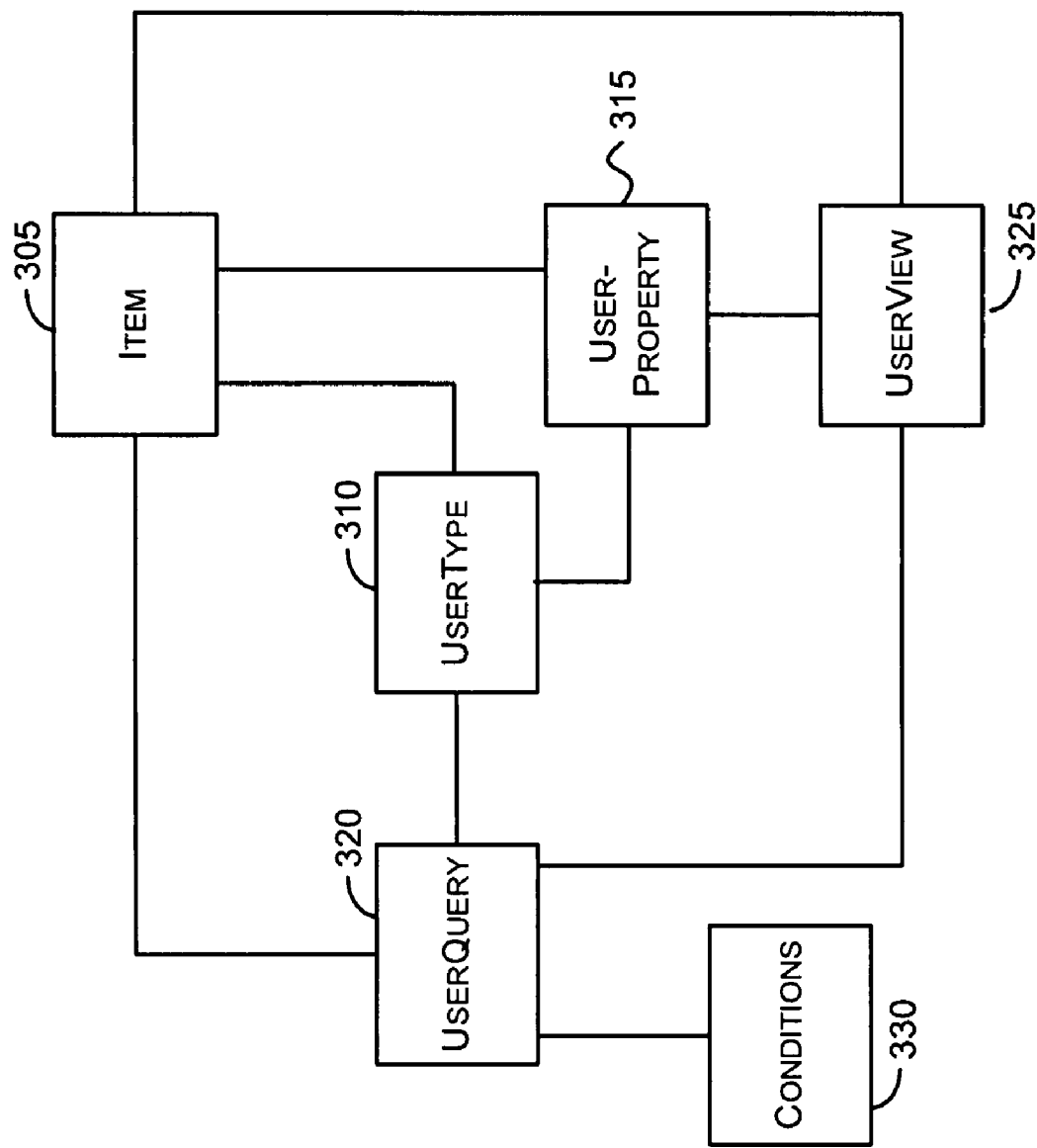
FIG. 3 is a block diagram that illustrates some exemplary components of an information model that may be used to extend types and properties of a released software product in accordance with aspects of the subject matter described herein.

FIG. 3 is a block diagram that illustrates some exemplary components of an information model that may be used to extend types and properties of a released software product in accordance with aspects of the subject matter described herein. To work with this system, it is intended that the software product have a knowledge that additional types may be added to the native types with which the software product is designed to work.

A native type is a type that is understood by a version of the software product when the version of the software product is created. A non-native type is a type that is created after the software product is created. A non-native type may also be understood by the software product via the techniques described herein.

In FIG. 3, each of the UserType 310, the UserProperty 315, the UserQuery 320, and the UserView 325 describe one or more of the Item 305 and how to set and retrieve data therefrom. The UserType 310 is associated with one or more UserProperties 315, the UserView 325 is associated with zero or more UserProperties 315, and the UserQuery 320 is associated with one or more Conditions 330.

An Item 305 may include any object that data on a computer-readable medium is capable of representing. Some exemplary items include files, folders, contacts, images, database objects, application data, lists, sets of data (ordered or unordered), and the like.

The UserType 310 may describe a superset or subset of the native properties for an Item. An Item such as a contact may include native properties including first name, last name, and e-mail address. A UserType may indicate that all or a subset of the native properties of the contact be included in a new type (e.g., business contact) and may also indicate new properties (e.g., organization and priority) to include in the new type.

The UserProperty 315 is a property that is either a composite (meaning a calculated value of several native properties) or a direct reflection of a property which was present on a native type. A direct reflection of a property that was present on a native type is a property that may be obtained via a relationship between the new type and the native type. For example, referring to FIG. 2, the "Name" property of the home contact type 210 is a direct reflection of the "Name" property of the contact type 205. The value of the "Name" property in an instance of an object of the home contact type 210 may be obtained by using a query. In one embodiment, this may be performed using a structured query language (SQL) statement as described in more detail below.

A UserQuery 320 comprises a definition that allows a user to express queries over data in terms of UserTypes 310 and UserProperties 315. The UserQuery 320 may be composed of one or more Conditions 330.

The Conditions 330 specify one or more criteria on properties that are to be met before an Item 305 or UserType 310 is returned via a query. The conditions 330 may include various operators including greater than, less than, equal to, not equal to, greater than or equal to, less than or equal to, like, not like, string comparison operators, date comparison operators, set operators, and the like.

A UserView 325 comprises a type which can be used to represent a logical view over a given UserType. A logical view may describe a subset of the actual properties described by a given type. The UserView 325 may specify a sorting order, grouping, width of viewing element, whether the view is of an element or a collection, and so forth.

An object defined by the UserQuery 320 may be associated with one or more objects defined by the UserViews 325. For example, a user may desire to present one set of fields when viewing the results of one query and to present another set of fields when viewing the results of another query. To allow this, multiple objects defined by the UserViews 325 may be associated with a single object defined by the UserQuery 320. For example, in a query on e-mails, one UserView object may specify that the information presented by the query include who the e-mail came from, the day the e-mail was sent, and the priority of the e-mail. Another UserView object associated with the query may specify that the information presented by the query include who the e-mail is from. The UserQuery 320 may indicate that query objects (i.e., instances of objects defined by the UserQuery 320) return objects defined by the UserType 310.

In addition to its other characteristics, UserType 310 may include an indication of how to obtain properties (e.g., UserProperties 315) from the underlying storage system. In one embodiment, the UserQuery 320 may include one or more SQL statements that indicate how to obtain properties from a SQL database. Executing a SQL statement may return all rows (or IDs of the rows) of the UserType 310 associated with the SQL statement. In another embodiment, the UserQuery 320 may indicate a file from which to obtain properties.

Each UserProperty 315 may indicate how to obtain a property when given other data (e.g., a row returned by executing a SQL statement above). For example, the UserProperty 315 may indicate that the property is calculated based on values in the row or may indicate another SQL statement that uses a value of the row (e.g., a key) to obtain a value in the same or another table.

Figure 4:
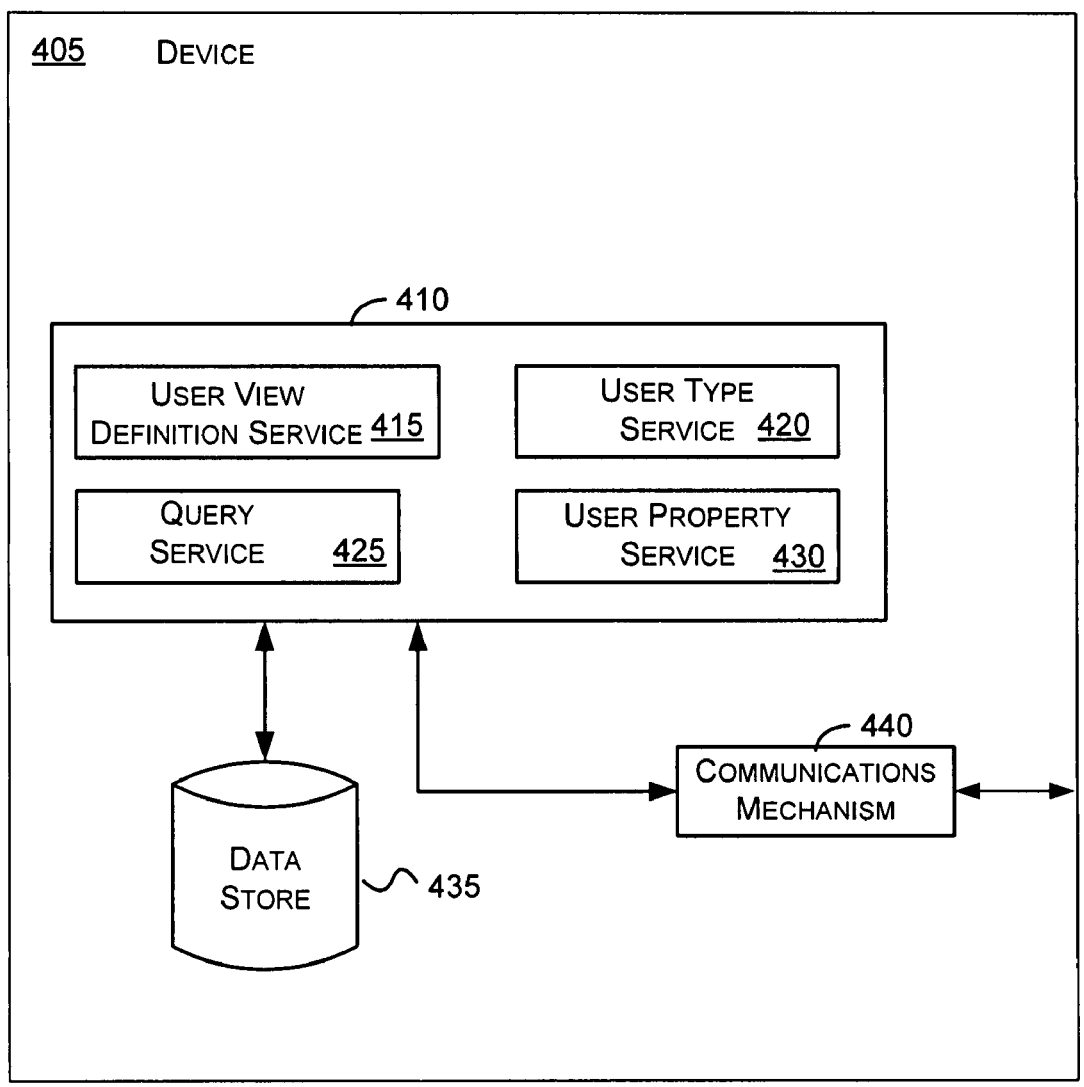
FIG. 4 is a block diagram that represents an exemplary device configured to operate in accordance with aspects of the subject matter described herein.

FIG. 4 is a block diagram that represents an exemplary device configured to operate in accordance with aspects of the subject matter described herein. The device 405 may include user data types component 410 that may include a user view definition service 415, a user type service 420, a query service 425, and a user property service 430. In addition, the device 405 may include a data store 435 and a communications mechanism 440.

In one embodiment, each of the services 415-430 may comprise one or more user or kernel-mode processes or threads thereof.

The user view definition service 415 may use a user view type definition (e.g., UserView 325 of FIG. 3) to create, find, remove, update, and otherwise manipulate user view objects. The user view definition service 415 may provide an application programming interface (API) that exposes the user view definition service 415's capabilities to other processes (e.g., an application program).

The user type service 420 may also use a user view type definition (e.g., UserView 325 of FIG. 3) and/or a user type definition (e.g., UserType 310 of FIG. 3) to create, remove, find, and otherwise manipulate user types. The user type service 420 may also provide an API that exposes the user type service 420's capabilities to other processes. To extend the types that a software package is capable of utilizing, an end-user, first party developer (i.e., a developer or company that created the software), third party developer, or the like may create a new type definition and provide the new type definition to the user type service 420.

The query service 425 may use a query object (e.g., defined by UserQuery 320) to query native and user data types according to conditions included in the query object. The query service 425 may display the results according to a user view definition associated with the query object. The query service 425 may also provide an API that exposes the query service 425's capabilities to other processes.

The user property service 430 may be used to set and obtain properties or related properties of a user property object. In addition, the user property service 430 may be used to add, delete, or change properties for a given user type. The user property service 430 may provide an API that exposes the user property service 430's capabilities to other processes.

The data store 435 may store the objects, type definitions, and other data as needed. The data store 435 may comprise a file system, database, volatile memory such as RAM, some combination thereof, or other data store and may be distributed across multiple devices. The data store 435 may be external or internal to the device 405.

The communications mechanism 440 allows the device 405 to communicate with other devices to service queries and/or store and retrieve data. The communications mechanism 640 may be a network interface or adapter 170, modem 172, or any other means for establishing communications as described in conjunction with FIG. 1.

It will be recognized that other variations of the device 405 shown in FIG. 4 may be implemented without departing from the spirit or scope of aspects of the subject matter described herein. Furthermore, components described in conjunction with FIG. 4 may be combined and/or broken into other components separated in other embodiments. In addition, it will be recognized that more, fewer, or other components may exist on the device 405 without departing from the spirit or scope of aspects of the subject matter described herein.

Figure 5:
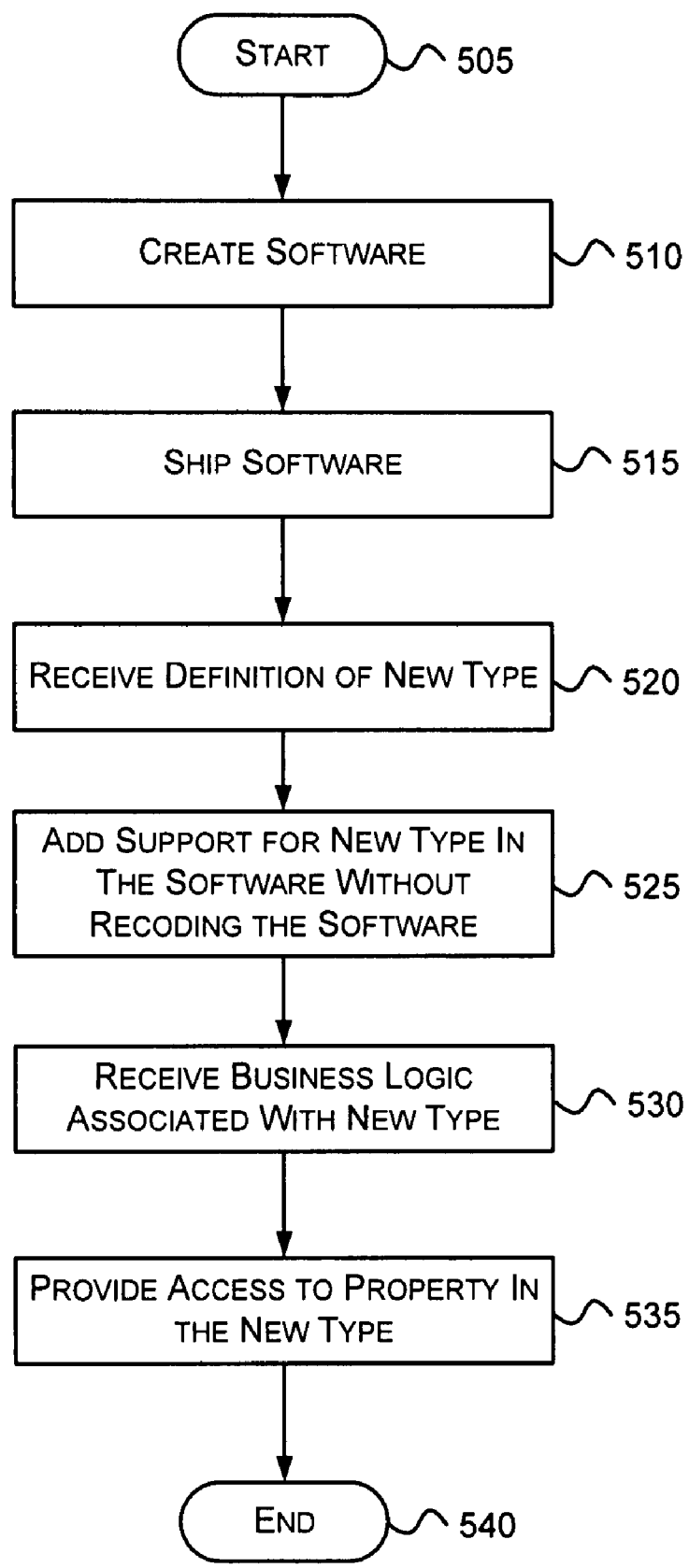
FIGS. 5-6 are flow diagram that generally represents exemplary actions that may occur in adding new types, properties, and queries in accordance with aspects of the subject matter described herein.
Figure 6:
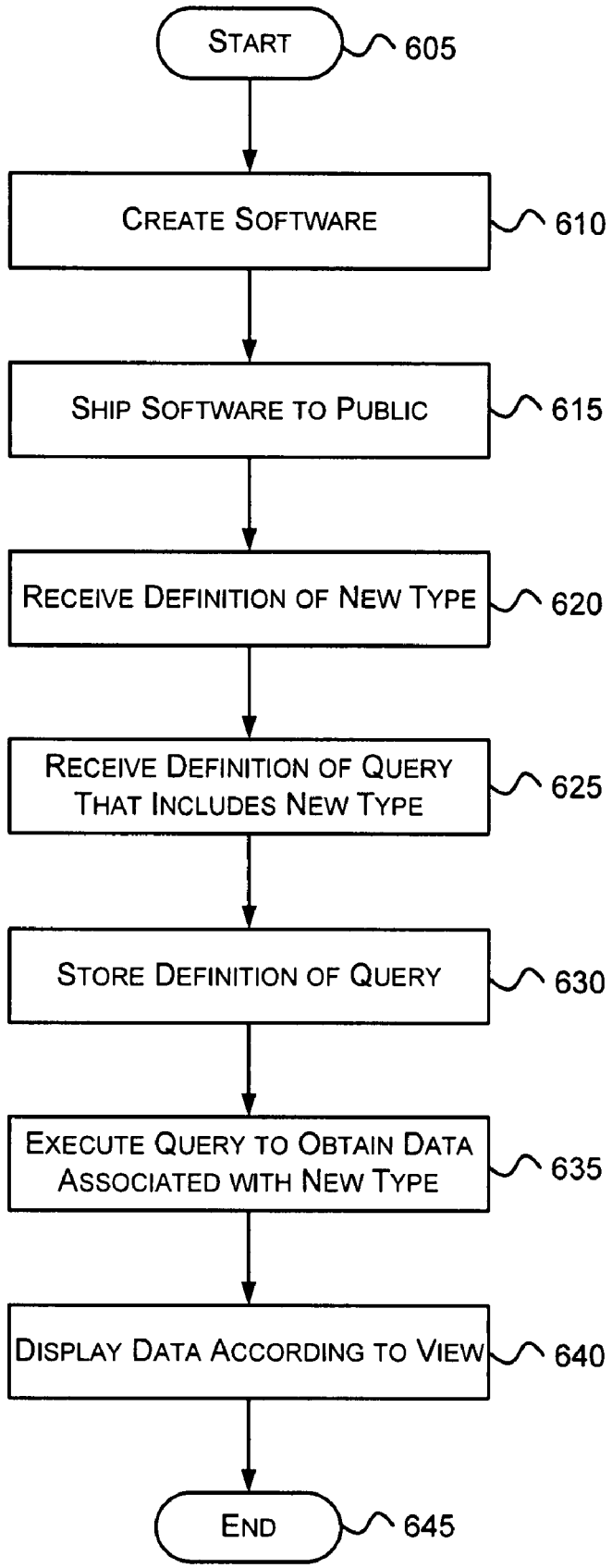

FIGS. 5-6 are flow diagram that generally represents exemplary actions that may occur in adding new types, properties, and queries in accordance with aspects of the subject matter described herein. For simplicity of explanation, the methods described in conjunction with FIGS. 5 and 6 are depicted and described as a series of acts. It is to be understood and appreciated that the aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methods in accordance with aspects of the subject matter described herein. In addition, those skilled in the art will understand and appreciate that the methods could alternatively be represented as a series of interrelated states via a state diagram or as events.

Turning to FIG. 5, at block 505, the actions begin. At block 510, software is created. For example, an e-mail software product may be created by a set of developers.

At block 515, the software is shipped. Shipped indicates that the software is available for use. In one embodiment, shipped includes placing the software on a Web site for download. In another embodiment, shipped may include placing the software on a server that is accessible to employees of a company. In yet another embodiment, shipped may include placing the software on non-volatile computer-readable media and physically shipping the media to another location.

At block 520, a definition of a new type is received. This may be done by registering the type with a user type service. For example, referring to FIG. 4, a user type service 420 receives a definition of a new type from an end user. This definition may be received after the software is already coded. As described above, the software may be coded to recognize new types that are created after the software is coded.

At block 525, support for the new type is added without recoding the software. In one embodiment, supporting a new type may simply involve extending an application model used by the software to include the new type. An application model includes a set of objects, types, and methods that the application supports. To support a new type, the type definition may be placed in a data store together with other data regarding the application model.

At block 530, business logic associated with the new type may be received. As described previously, business logic may, for example, validate or take advantage of properties in the new type. In one embodiment, business logic may correspond to an arbitrary sequence of steps that are taken in conjunction with validating or otherwise acting on data that is intended to update a property. This business logic may also be stored in a data store and may be accessed by the shipped software without recoding the software.

In another embodiment, the actions associated with block 530 may be skipped. A user may desire to have an additional property without having any additional business logic associated with the additional property. In this case, there is no need to obtain additional business logic.

At block 535, access to the property in the new type is provided. This may be done as described previously through a user interface, for example.

At block 540, the actions end.

Turning to FIG. 6, the actions that occur in conjunction with blocks 605-620 correspond to actions that occur in conjunction with blocks 505-520 of FIG. 5.

At block 625, a definition of a query that includes the new type is received. For example, referring to FIG. 4, a query service 425 receives a query definition regarding a new property that was received by the user property service 430.

At block 630, the definition of the query is stored. For example, referring to FIG. 4, the query service 425 stores the definition of the query in the data store 435.

At block 635, the query is executed to obtain data associated with the new type. This may involve evaluating one or more conditions as described previously.

At block 640, the obtained data is displayed according to a view associated with the query. As described previously, a view may indicate that a query should return a subset of the properties of a new type. The view may also indicate formatting parameters by which data corresponding to the properties are to be formatted. A query may include data from native types as well as from the new type without departing from the spirit or scope of aspects of the subject matter described herein.

At block 645, the actions end.

As can be seen from the foregoing detailed description, aspects have been described related to type and property definition support for software. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage medium having computer-executable instructions, which when executed perform actions, comprising:
   receiving a definition of a new type after a version of an e-mail software is released, the new type defining a property, the e-mail software product, when created, supporting a first application model that includes a first set of objects, types, and methods;
   receiving an indication of actions to take in conjunction with updating data associated with the property, wherein the actions comprise business logic created after the version of the e-mail software product was released, wherein the business logic comprises steps taken to validate the data associated with the property; and
   adding the new type to the first application model of the software to obtain a second application model that the e-mail software product supports, the second application model including a second set of objects, types, and methods including the new type, wherein the property is derived from another property of another type of the second application model, and, adding the new type to the first application model comprises adding a reference to the another property and an indication of how to derive the property from the another property.

2. The computer-readable storage medium of claim 1, further comprising providing access to the property via the software.

3. The computer-readable storage medium of claim 2, wherein providing access to the property via the e-mail software product comprises displaying data corresponding to the property in a user interface and allowing a user to change the data via the user interface.

4. The computer-readable storage medium of claim 1, displaying an additional data field corresponding to a new property of an instance of an object defined by the new type allowing a user to update data in the additional data field.

5. The computer-readable storage medium of claim 1, wherein the second set of objects, types, and methods is a superset of the first set of objects, types, and methods.

6. A method implemented at least in part by a computer, the method comprising:
   receiving a definition of a query, the definition indicating a new type to provide when the query is executed, the software, when created, supporting an application model that includes a set of objects, types, and methods, the new type being added to the application model after the software was created without modifying the software;
   storing the definition of the query in a data store, wherein the software comprises an e-mail software product, wherein the definition of the query includes an indication of one or more views associated with the query, each view indicating a different subset of the properties of the type; and
   executing the query and indicating one of the views associated with the query, the one of the views comprising:
   (1) a sorting order,
   (2) a grouping,
   (3) a width of viewing element and
   (4) whether the view is of an element or a collection;
   adding the new type to the application model of the software to obtain a second application model that the e-mail software product supports, the second application model including a second set of objects, types, and methods including the new type, wherein the property is derived from another property of another type of the second application model, and, adding the new type to the first application model comprises adding a reference to the another property and an indication of how to derive the property from the another property.

7. The method of claim 6, wherein the type indicated in the definition of the query is not included in the set of objects, types, and methods supported by the software, when created.

8. The method of claim 6, wherein a type comprises a set of one or more properties.

9. The method of claim 8, wherein the definition of the query comprises one or more conditions on the set of one or more properties.

10. The method of claim 9, wherein at least one of the conditions indicates an operator including greater than, less than, equal to, not equal to, greater than or equal to, less than or equal to, like, not like, a string comparison operator, a date comparison operator, and a set operator.

11. The method of claim 6, further comprising displaying data corresponding to the subset of properties indicated by the one of the views indicated.

12. In a computing environment, an apparatus, comprising:
a computer comprising:
- a type service operable to receive a definition of a new type to be supported by an e-mail software product, the new type being received after the e-mail software product has been embodied in computer code;
- a display operable to display an additional data field corresponding to a new property of an instance of an object defined by the new type allowing a user to update data in the additional data field, the new property is a complex property that describes relationship information between two objects, wherein the new property is derived from another property of another type, and, adding the new type comprises adding a reference to the another property and an indication of how to derive the new property from the another property;
- a data store operable to store the definition of the new type; and
- a query service operable to receive a definition of a query that uses the new type.

13. The apparatus of claim 12, wherein the new type was not defined before the e-mail software product was embodied in computer code.

14. The apparatus of claim 12, further comprising a view definition service operable to associated a view definition with a query definition, the view indicating a subset of properties of the new type to display when the query is executed.

15. The computer-readable storage medium of claim 1, the property is a complex property that describes relationship information between two objects.

* * * * *